A. E. HOLMES.
DRINK MIXER AND DISPENSER.
APPLICATION FILED APR. 15, 1920.

1,348,222. Patented Aug. 3, 1920.

INVENTOR
Andrew E. Holmes
BY
Elbert R Bronner
ATTORNEY

UNITED STATES PATENT OFFICE.

ANDREW E. HOLMES, OF NEW YORK, N. Y.

DRINK MIXER AND DISPENSER.

1,348,222.  Specification of Letters Patent.  Patented Aug. 3, 1920.

Application filed April 15, 1920. Serial No. 374,133.

*To all whom it may concern:*

Be it known that I, ANDREW E. HOLMES, a citizen of the United States, residing at and in the city and county of New York, State of New York, have invented a new and useful Drink Mixer and Dispenser; and I do declare the following to be a full, clear, and exact description of the invention, such as will enable others skilled in the art to which it appertains to make and use the same.

This invention relates to a combined automatic malted milk dispenser and drink mixer for malted milk drinks and the like, and the main object is to feed the powdered milk in a pre-determined quantity into the glass for dissolving same during the agitating process of mixing the drink.

The feature of such a feeding mechanism in combination with a drink mixing device will be more appreciated when it is understood that in the present drink served to the trade, the powdered malted milk is generally not thoroughly dissolved, as it is first put into the glass in bulk with a spoon and as a result forms a mass at the bottom of the glass. During the rotation of the disk and the rotary spindle in the drink, the powder is further thrown to the side of the glass where it adheres and consequently does not fully dissolve. My invention, therefore, consists of certain mechanism whereby the powdered malted milk is fed sparingly into the drink before or during its mixing operation preferably during the agitation of the drink. I further provide means to terminate automatically the feeding and mixing operations. My invention provides economy in the use of the powdered malted milk, as well as the elimination of the crude method of using a spoon, and further prepares a drink in which all of the ingredients including the powdered malted milk are thoroughly dissolved and combined into one solution.

With these objects in view, my invention comprises various features of construction as hereinafter described in the following specification and pointed out in the claims and illustrated in the appended drawings, in which:

Figure 1:
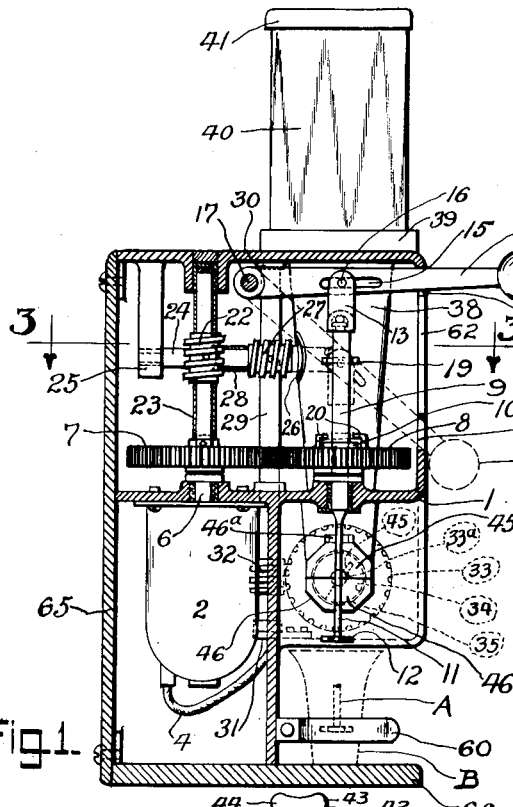
Figure 1 is a partial vertical section of my device.

The numeral 1 indicates a casing, within which is placed an electric motor 2 receiving its electrical supply from any suitable source through the cable 3 and 4 controllable by the switch 5. Rotatable by the motor is a shaft 6 upon which is a driving member, for example, a gear 7 meshing with a driven member 8, having a spindle 9 slidable therethrough within a bushing 10. The spindle 9 is provided with a reduced portion 11 and a disk 12, and is provided with an antifrictional universal head portion 13 forked to receive the shifting lever 14 provided with a slot 15 for engaging the pin 16 secured in the forked portion of the member 13. The lever 14 is fulcrumed at 17 and is provided with a hand knob 18 for example in shape of ball. A pin 19 is secured in the spindle 9 to engage the clutch members 20 of the driven member 8, when the mixing spindle is thrust into the dotted positions as at "A."

The motor shaft 6 extends upwardly to the bearing 21 and a worm drive 22 is secured thereon meshing with a worm wheel 23 fastened to the shaft 24 rotatable in bearings 25 and 26. Another worm drive 27 is secured upon the shaft 24 and meshes with a worm wheel 28 rotatable upon the shaft 29 in bearings 30 and 31. The shaft 29 drives another worm sleeve 32 meshing with a worm wheel 33 which rotates through the shaft 33ª a screw conveyer 34 within the compartment 35 having openings 36 and 37. A funnel or hopper 38 leads to the opening 36 and extends upwardly to an open flanged portion 39 in the casing 1, into which is placed a glass jar or receptacle 40 containing the powdered malted milk. A cover 41 is removable upon the top of the jar 40 for placing additional powdered malted milk when so desired. A pin 42 is fastened into the shaft 33ª and is for the purpose of engaging the wing members 43 and 44 of the switch 5 for stopping the motor 2, so as to govern the revoluble time for the mixing spindle 11 and regulating the conveyer 34 in discharging the pre-determined quantity of powdered malted milk, which, for example, by the arrangement for the reduction of speed in the worm gearing approximately makes one complete revolution during the desired time for mixing the drink. The pin 45 opens the valve or door 46 which permits the powdered malted milk to be discharged by the conveyer into the glass B during the first half of its rotation. The door 46 further acts to preserve the powdered malted milk in a dry state, as when exposed to air, it absorbs moisture and becomes gummy or paste like, in which condition it would be difficult to feed by the described mechanism. It is to be understood that I may arrange the opening 37 of the spout to a reduced portion, and the conveyer 34 may correspond likewise. I further provide means for keeping the powdered malted milk in a loosened condition in the hopper 38 by a rod 50 with agitating arms 51 rotatable by gears 52 and 53 through the shaft 54, pulley 54ª, belt 55 and the pulley 56 on the shaft 33ª. The panel 65 may be used for advertising purposes and the slab 66 may be of onyx, marble, or part of the casing 1, if so desired.

Figure 2:
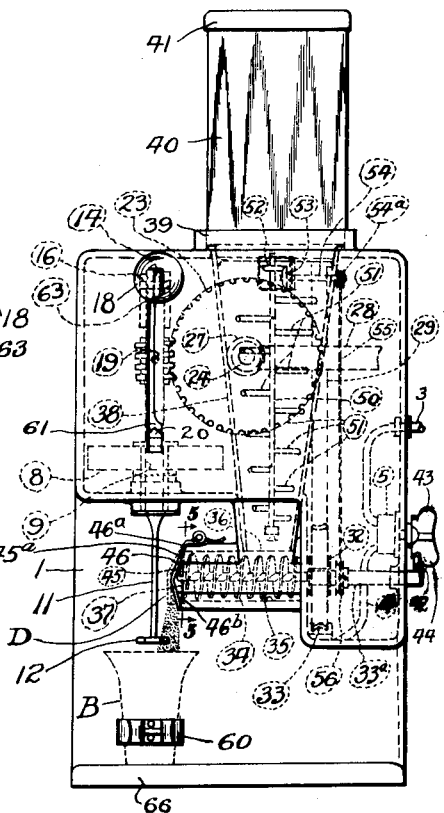
Fig. 2 is a front view of the same device.
Figure 3:
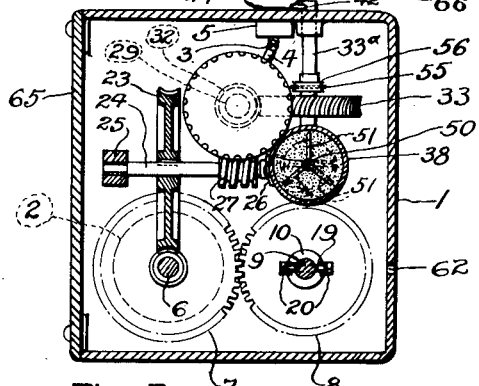
Fig. 3 is a horizontal section at line 3—3, Fig. 1.
Figure 4:
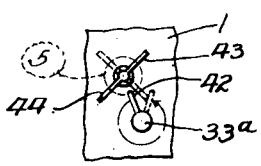
Fig. 4 shows a face view of the automatic mechanism for regulating the quantity of powdered malted milk per drink.
Figure 5:
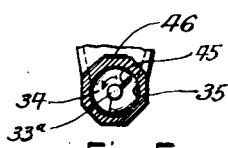
Fig. 5 is a view of feeding spout taken on line 5—5, Fig. 2.

In operation the glass B is filled with the desired liquid solution and placed into the holder 60 for the clamped position as at B, Fig. 2. The lever 14 is now thrown into the abnormal position as per dotted form at C in which the pin 19 in the spindle 9 engages the clutch members 20 which have a diverging top portion so as to allow the pin 19 to slide into engagement therewith, at the same time the lever, 14, which is of spring material locks itself into the offset portion 61 of the slot 62. The motor 2 is then started by turning on the switch 5, in which the wings 43 and 44 assume the position as per dotted lines in Fig. 4. The starting of the motor through the reduced gear mechanism now rotates the conveyer 34 slowly and simultaneously with the spindle 11 and disk 12 which are now within the glass B as per dotted position, noted at A, Fig. 1. The shaft 33ª rotating the conveyer 34 revolves the pin 45 which engages the offset portion 45ª of the valve or flap door 46 opening same under the tension of a spring member 46ª, which allows sufficient powdered malted milk to be dispensed into the glass B as illustrated in Fig. 2, for the mixing of a single drink. As the pin 45 revolves, the door closes. The pin 45 continues to rotate as shown by the arrow in Fig. 5, the offset portion 46ᵇ of the door 46 being less than the offset 45ª for the clearance of the pin 45 by the closed door. During the end of its rotation the pin 42 engages one of the wing portions of the switch 5 as shown in dotted form Fig. 4, whereby the powdered malted milk feeding mechanism of the conveyer 34 automatically becomes inoperative due to the switch 5 shutting off the electrical supply to the motor 2. Coincidentally the spindle 11 and disk 12 stop rotating in their agitation for dissolving the powdered malted milk within the glass containing the liquid solution, and the operator raises the spindle to its normal position as shown in the drawings, by lifting up the lever 14 which locks itself into the offset portion 63 of the slot 62. The powdered malted milk is retained in a loosened condition for feeding into the chamber 35 by agitating means, for example by the rod 50 and arms 51 which rotate approximately one revolution during the mixing of the drink.

My invention comprises the combination of the dispensing mechanism for powdered malted milk in conjunction with a drink mixing device, whether it is automatically operated by motive power or actuated by manual means. It is to be understood that I may feed the powdered malted milk in a manner other than shown; in such an event it may require different means for discharging the powdered malted milk into the glass during the mixing operation, which, however, would not disclose any particular advantage over my present method, therefore, no corresponding views are shown thereof.

It is to be understood that this automatic powdered malted milk dispenser as heretofore described may be embodied in a device having more than one mixing spindle, which will permit the making of one drink at a time without interfering with any of the others, or permitting the mixing of several drinks at one time each independently of the other. For such a device I may refer to, for example, my co-pending patent applications bearing Serial Number 369,550, filed March 29, 1920 and Serial Number 369,551, filed March 29, 1920, respectively.

It is to be understood, I do not confine myself to the exact details, arrangement of parts, motive power, means to drive and operate the mixing spindle and the feeding mechanism for the powdered malted milk as hereinbefore described, and if desired, I may use other means within the scope of the claims without departing from the spirit of the invention.

Having thus described my invention, what I claim as new and desire to secure by Letters Patent of the United States, is as follows:

1. A device of the character described, the combination of a revoluble spindle for mixing drinks, motor mechanism for actuating the spindle, means controllable at the will of the operator for throwing said motor mechanism into action in order to cause the spindle to mix the drink, a dispensing device connected with said motor mechanism and driven thereby for dispensing a measured amount of material in the form of a loose powder during the time the drink is being mixed, and mechanism connected with said motor mechanism and controllable by movements thereof for automatically regulating the discharge of said powder and for throwing said motor mechanism out of action when the mixing of the drink is finished.

2. A device of the character described, the combination of a revoluble spindle for mixing drinks, motor mechanism for actuating the spindle, means controllable at the will of the operator for throwing said motor mechanism into action in order to cause the spindle to mix the drink, a dispensing device connected with said motor mechanism and driven thereby for dispensing a measured amount of material in the form of a loose powder during the time the drink is being mixed, said powder arranged in a receptacle having agitating means for keeping same in a loosened condition and mechanism connected with said motor mechanism and controllable by movements thereof for automatically regulating the discharge of said powder and for throwing said motor mechanism out of action when the mixing of the drink is finished.

3. A device of the character described, the combination of a revoluble spindle for mixing drinks, motor mechanism for actuating the spindle, means controllable at the will of the operator for throwing said motor mechanism into action in order to cause the spindle to mix the drink, a dispensing device connected with said motor mechanism and driven thereby for dispensing a measured amount of material in the form of a loose powder during the time the drink is being mixed, said powder arranged in a receptacle having agitating means therein for keeping same in a loosened condition, said receptacle having an opening at one end thereof for the purpose of said powder to escape onto a conveying mechanism for discharging said powder into the glass during its mixing operation, and mechanism connected with said motor mechanism and controllable by movements thereof for automatically regulating the discharge of said powder and for throwing said motor mechanism out of action when the mixing of the drink is finished.

4. A device of the character described, the combination of a revoluble spindle for mixing drinks, motor and operating mechanism for actuating said spindle, a dispensing device connected with said motor mechanism, said dispensing device for the purpose of feeding a measured amount of powdered material into the drink during its mixing operation, said powdered material arranged in a receptacle having agitating means to keep same in a loosened condition, a conveying mechanism for discharging same, and means for automatically terminating the feeding of said powdered material and discontinuing the actuation of said spindle.

5. A device of the character described, the combination of a revoluble spindle for mixing drinks, motor and operating mechanism for actuating said spindle, a dispensing device connected with said mechanism for the purpose of feeding a measured amount of soluble material into the drink, automatic means for terminating the feeding of said soluble material and for throwing said motor mechanism out of action.

6. A device of the character described, the combination of a revoluble spindle for mixing drinks, shifting mechanism for raising and lowering said spindle, power means for actuating said spindle, a dispensing device adjacent to said spindle, said dispensing device for the purpose of feeding a measured amount of soluble material into the drink, said soluble material to be dissolved by said actuating spindle when in its lowered position, and means to terminate said actuation of said spindle after its mixing operation.

In testimony whereof I have hereunto set my hand on this 14th day of April A. D. 1920, in the presence of two subscribing witnesses.

ANDREW E. HOLMES.

Witnesses:
 ELBERT R. BRONNER,
 WILLIAM A. HAYES.